United States Patent [19]

Kawahara et al.

[11] Patent Number: 5,810,463
[45] Date of Patent: Sep. 22, 1998

[54] ILLUMINATION DEVICE

[75] Inventors: Atsushi Kawahara, Yokohama; Osamu Inoue, Kumagaya, both of Japan

[73] Assignee: Nikon Corporation, Tokto, Japan

[21] Appl. No.: 563,232

[22] Filed: Nov. 28, 1995

[30] Foreign Application Priority Data

Nov. 28, 1994 [JP] Japan .................................. 6-293219
Feb. 7, 1995 [JP] Japan .................................. 7-018318
Jun. 15, 1995 [JP] Japan .................................. 7-148453

[51] Int. Cl.$^6$ ..................................................... F21V 8/00
[52] U.S. Cl. ............................ 362/31; 362/32; 362/231; 362/234; 362/245; 250/227.2; 358/474; 385/146
[58] Field of Search ............................ 250/216, 227.11, 250/227.2, 227.26, 227.28, 227.31, 234; 355/67; 399/4, 5; 358/474, 475, 494; 382/323; 359/599; 385/120, 146; 362/31, 32, 230, 231, 242–249, 234

[56] References Cited

U.S. PATENT DOCUMENTS

| 4,190,347 | 2/1980 | Siegmund | ................................. 355/67 |
|---|---|---|---|
| 4,767,172 | 8/1988 | Nichols et al. | ........................ 385/146 |
| 4,797,711 | 1/1989 | Sasada et al. | ............................. 355/67 |
| 4,924,357 | 5/1990 | Yamashita et al. | ....................... 362/32 |
| 4,974,094 | 11/1990 | Morito | ..................................... 362/32 |
| 5,274,228 | 12/1993 | Kaplan | ............................... 250/227.31 |

FOREIGN PATENT DOCUMENTS

4-109755  4/1992  Japan .

*Primary Examiner*—Alan Cariaso
*Attorney, Agent, or Firm*—Oliff & Berridge

[57] ABSTRACT

An illumination device for an image input device includes a cylindrical light guiding unit, a board having a plurality of light emitting diode elements, a connection member connecting the light guiding unit with the board and a terminal reflection member formed at one end of the light guiding unit. A surface of the light guiding unit has a scattering reflection member extending linearly along the axial direction of the light guiding unit. A cylindrical reflection member is spaced around the light guiding unit and a linear space is provided in the reflection member along the axial direction of the guiding unit.

10 Claims, 10 Drawing Sheets

ILLUMINATION DEVICE

BACKGROUND OF THE INVENTION

1. Field of the Invention

The present invention relates to a lighting device or image input device that illuminates an original manuscript. More particularly, the present invention relates to a lighting device capable of lighting a linear portion of the original manuscript that is read by using a linear sensor.

2. Background of Related Art

Various image input devices such as facsimiles, image scanners and copiers are known that convert images of an original manuscript into image signals. Image processing is executed by processing the signals after transmitting the produced image signals to other devices such as computers.

In such image input devices, an original manuscript or text is set on a transparent plate (platen glass) to produce the image signals representing the two dimensional images from a one dimensional solid shooting element or line sensor. This is accomplished by moving a reading unit along the platen glass or by moving the original manuscript while maintaining the position of the image reading unit. The reading unit includes an illumination device and/or line sensor.

Various ideas have been proposed regarding this type of lighting device or image input device. For example, Japanese Laid-Open Patent Publication Hei 4-109755 is discussed below with respect to FIGS. 6 and 7. A scattering zone 32 is composed of minute granules having a high refraction index and continuously or intermittently attached in the axial direction on an outer surface of a light transmitting rod 31 formed by quartz. A pipe shaped cover 34 has a slit opening 33 formed along the axial direction and has an inner mirrored surface. A pipe shaped cover 34 is coaxially provided on the perimeter of the light transmitting rod 31.

Figure 6:
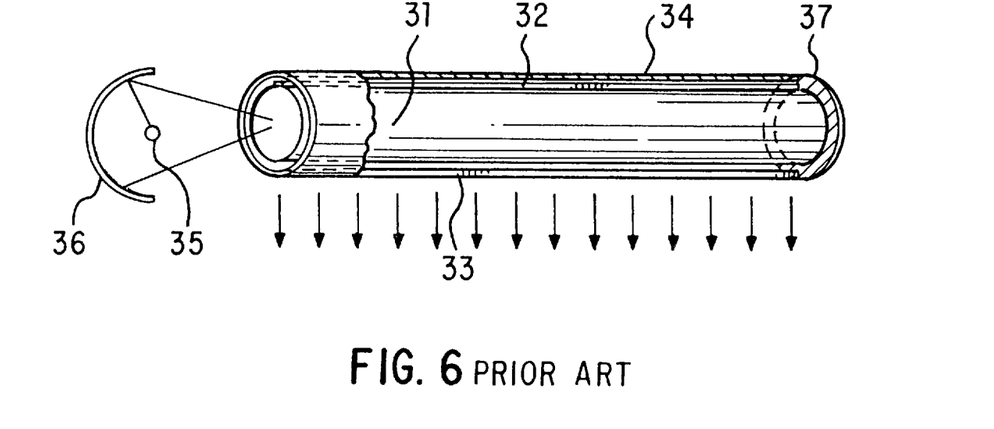
FIG. 6 is a partially opened vertical cross section of a conventional lighting device.
Figure 7:
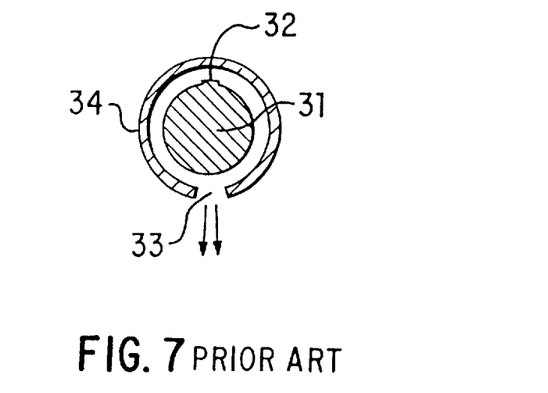
FIG. 7 is a vertical cross section of FIG. 6.

A point-like light source 35 and concave reflection mirror 36 are provided on the central axis of the light transmitting rod 31 facing one end surface of the rod 31. A reflection mirror 37 is then provided on the other end surface of the cover 34. The light emitted from the point-like light source 35 and the light reflected from the convex reflecting mirror 36 enters from one end of the light transmitting rod 31 and is reflected several times within the rod 31, after which part of the light reaches the scattering zone 32 where it is scattered.

The light rays passing near the central axis of the rod 31 enter with an angle larger than a critical angle of the inner surface of the rod 31. Hence, the light rays are emitted to the outside of the rod 31 without being reflected. The light rays heading towards the slit opening 33 are radiated outside of the cover 34. The light rays that miss the slit opening 33 are reflected by the inner surface of the cover 34 and reenter the rod 31. As a result, the light rays coming out of the slit opening 33 extend lengthwise linearly along the axis of the rod 31 and can be used as a linear light source for the image input device.

Figure 8:
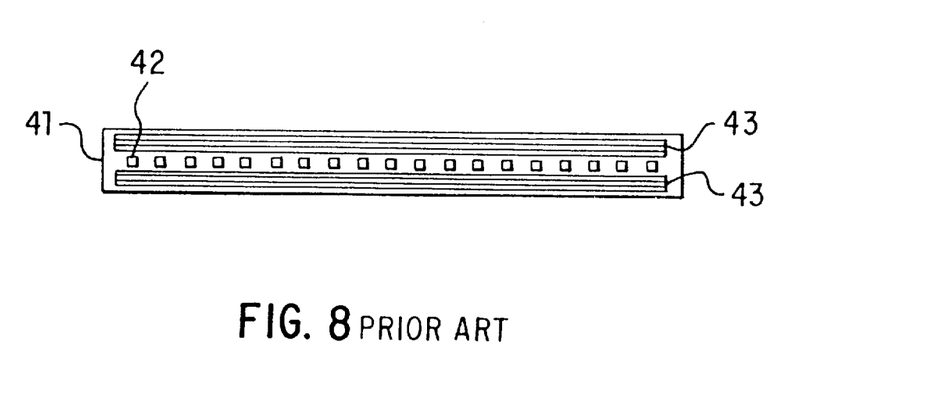
FIG. 8 is a front view showing another conventional lighting device.
Figure 9:
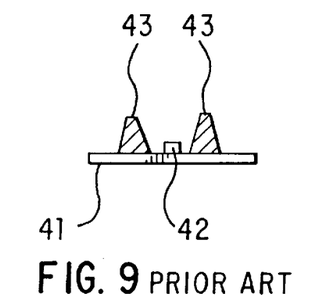
FIG. 9 is a vertical cross section of FIG. 8.
Figure 10:
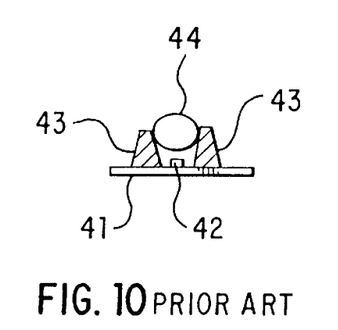
FIG. 10 is a vertical cross section showing a lens mounted on the reflection member of FIG. 9.

FIGS. 8–10 show another conventional light source used for linear illumination. A plurality of LEDs 42 are arranged along a straight line on a rectangular board 41. A convex-shaped reflection member 43 is formed using white plastic for the effective reflection of the light. The reflection member 43 is provided on both sides of the LED 42 array. Thus, light rays emitted toward the side are reflected upward to enable effective utilization of the light rays. This type of light source is especially used for an image input device using a contact type linear CCD and facsimiles.

With this type of light source, a transparent rod-shaped lens 44 may be provided between the ejection-side tips of the reflection member 43 to more effectively gather light rays as shown in FIG. 10.

However, in a light source device having a structure as shown in FIGS. 6 and 7, the light source 35 is a point-like light source. Thus, a halogen or xenon lamp having a large amount of light is needed to obtain bright illumination. These lamps cause problems such as high power consumption and heat generation. Expensive and durable quartz glass may then be used for the light transmitting rod 31.

The light source described in FIGS. 8–10 have the problem of uneven illumination light. In other words, even if the LEDs 42 are densely arranged in an array, an uneven amount of illumination light cannot be avoided because the LEDs 42 are point-like light sources. Hence, a high quality image is not produced for an image input device requiring uniform lighting.

Figure 11:
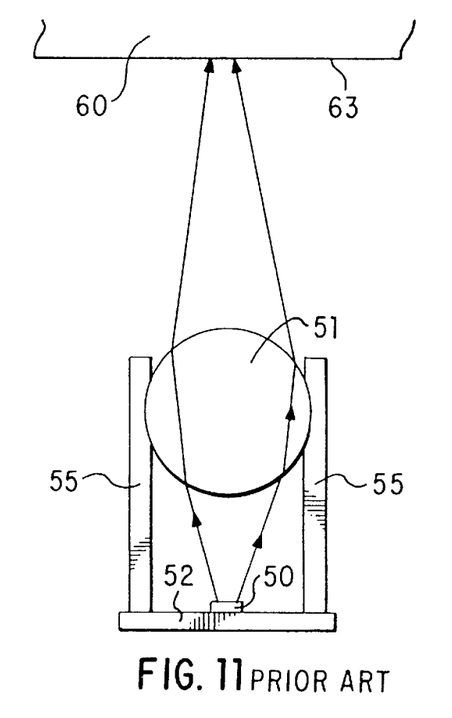
FIG. 11 is a side view of a conventional illumination device.
Figure 12:
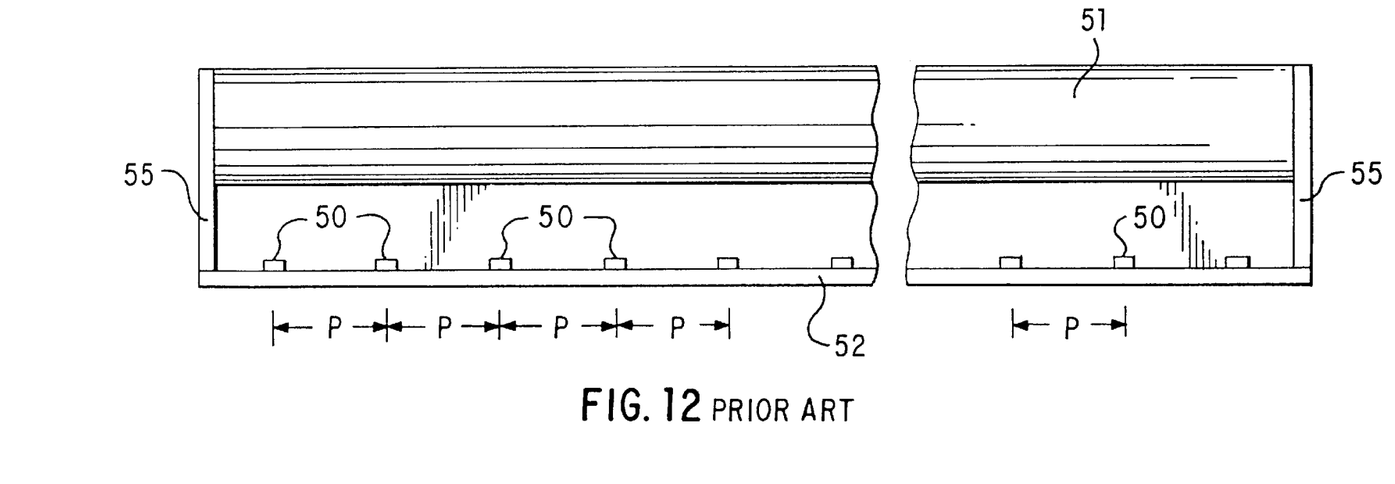
FIG. 12 is a frontal view of a conventional illumination device.

Image input devices may further include light emitting diode elements 50 bonded in a row with specified intervals (P) on the surface of the board 52 as shown in FIGS. 11 and 12. A cylindrical transparent member 51 is sometimes placed above the light emitting diode elements 50. The transparent member 51 is preferably anchored to the board 52 using an appropriate support member 55.

Illumination devices that place the transparent member 51 above the light emitting diode elements 50 illuminate the image surface 63 by gathering light emitted from the light emitting diodes 50 and pass the light onto the image surface 63 of the original manuscript.

The line sensor is a linear solid shooting element using CCDs and has a reading width of about 10 $\mu$m. Hence, for a device in which reduced projection is used by the optical system, the shooting device has a specified length corresponding to a reduction rate of the optical system. Moreover, when composing images on a shooting device using an optical system such as lenses, the original medium is read with a line-like light having a width of about 0.1 mm on the image surface 63. This is extremely narrow because the image is directly read by moving the shooting device (line sensor) closer to the original medium 60.

Since the range of the original medium 60 requires illumination by light to become extremely thin, the use of a fluorescent lamp having a large amount of light enables lighting with sufficient light. Moreover, when using light emitting diodes as the light source, since the amount of light from each single element is smaller than the fluorescent lamp, the gathering of light is executed using a transparent member 51 to increase the illuminance on the image surface 63 as well as placing the board 52 directly adjacent the original medium 60.

A fluorescent lamp is more often used today because it has a greater light emitting amount than a light emitting diode. However, fluorescent lamps have a shorter longevity than a light emitting diode. Hence, maintenance and replacement of the illumination device becomes necessary.

Moreover, for illumination devices with light emitting diodes, the light emitting diode elements are often placed near the original medium because the light emitting amount is small. Hence, if the size of the original medium is large, the light emitting diode elements must be arranged to match the size of the original medium, which results in a large number of light emitting diode elements.

Moreover, when a transparent member 51 is used to gather light, numerous light emitting elements are necessary to match the size of a larger original medium.

Figure 13:
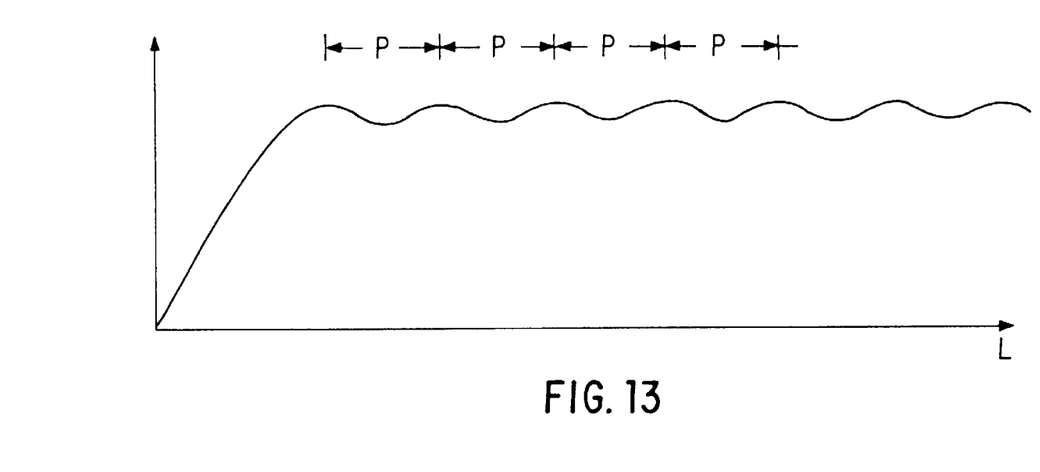
FIG. 13 is a diagram showing illuminance of a conventional illumination device.

Furthermore, when the light emitting diode elements are linearly arranged or when the image surface of the original medium is directly lighted by light emitting diode elements, a problem of uneven illuminance occurs in the pitch of the space P between the light emitting diode elements wherein the illuminance is high near the light emitting diode elements and the brightness is slightly dark between the light emitting diode elements as shown in FIG. 13.

SUMMARY OF THE INVENTION

It is an object of the present invention to provide a lighting device capable of producing effective and uniform linear lighting.

The lighting device of the present invention may include a main light guiding unit formed by a rod-shaped transparent member and a sub-light guiding unit connected in the tangential direction of the outer perimeter of the main light guiding unit and formed into a flat board shape using the transparent member. The light guiding unit includes a linear shaped light scattering unit on the outer perimeter surface of the main light guiding unit and a light source parallel to the axial direction of the main light guiding unit facing the end surface of the sub-light guiding unit.

The sub-light guiding unit may be placed at such an angle that most of the light rays from the light source reach the light scattering unit after being reflected several times by the inner surface of the main light guiding unit.

Another light source may be placed facing one end surface of the main light guiding unit.

The light rays guided from the light source to the sub-light guiding unit are incident in the tangential direction of the outer perimeter of the main light guiding unit. Most of the incident light rays reach the light scattering unit after being reflected several times by the inner surface of the main light guiding unit. Hence, the distance between the light source and the light scattering unit is preferably secured to enable sufficient scattering of light rays. Uniform lighting is obtained by effective usage of the incident light rays.

Balanced color illumination with a uniform amount of light is obtained by placing numerous densely arranged LEDs having a small amount of light on one end surface of the sub-light guiding unit and by placing a light source having a large amount of light on one axial end of the main light guiding unit.

The lighting device of the present invention may also include a cylindrical light guiding unit having a high degree of transparency. The light guiding unit includes a board having a plurality of light emitting diode elements anchored at one edge of the light guiding unit through a pipe-like connection member. A terminal reflection member is provided on the other edge of the light guiding unit. A surface of the light guiding unit comprising a belt-like scattering reflection member extends linearly along the axial direction to randomly reflect light. A cylindrical reflection member is further provided around the light guiding unit to form a space along the axis in the reflection member at a position facing the scattering reflection unit.

The present invention may also use an outer shell unit as a reflection member having a larger inner diameter than the outer diameter of the light guiding unit to store the light guiding unit in the outer shell.

The present invention may have a reflection membrane on the outer surface of the light guiding unit, which may be used as a reflection member.

The width of the space formed in the reflection member is less than half of the circumference of the reflection member.

The present invention may have a mirrored inner surface for the pipe-like connection member. Furthermore, the surface of the board may also be mirrored.

Light emitting diode elements arranged on the board may consist of red, green and blue light emitting diode elements.

Since the present invention may include a board on which the light emitting diode elements are arranged to one edge of the light guiding unit, the light from the light emitting diode elements is incident inside the light guiding unit. A terminal reflection member may be provided on the other side of the light guiding unit. A cylindrical reflection member is provided around the circumference of the light guiding unit. The light entering the light guiding unit can be reflected and moved along the axis.

Still further, a belt-like scattering reflection unit may be provided on the surface of the light guiding unit. Some of the light rays advancing inside the light guiding unit can be randomly reflected.

Further, because a space in the reflection member is positioned to face the scattering reflection unit, part of the light rays randomly reflected by the scattering reflection unit can illuminate outside the space.

If an outer shell unit is used as a reflection member, the light guiding unit can easily be stored inside the reflection member and the light rays emitting from the light guiding unit can be returned to the light guiding unit by reflecting from the inner surface of the outer shell.

Moreover, when a reflection membrane is formed on the surface of the light guiding unit as the reflection member, the light rays entering from the edge of the light guiding unit will not be emitted outside from any other place than the space to enable light rays to be reflected and advanced along the axis of the light guiding unit without weakening the light rays.

Moreover, by having the space be less than half the circumference of the reflection member, the light rays illuminating outside of the light guiding unit through the space can be shifted to one side of the center of the light guiding unit to enable entire light rays coming out of the space to illuminate the image surface of the original medium.

By making the inner surface of the connection member be mirrored, the light rays from light emitting diode elements can be effectively guided to the edge of the light guiding unit and incident inside the light guiding unit.

In addition, by making the surface of the board have a mirrored surface, the light rays advancing along the axis of the light guiding unit, returning to the edge of the light guiding unit after being reflected by the other edge and being injected from the edge of the light guiding unit towards the board can be returned to the inside of the light guiding unit.

Moreover, by using the board on which red, green and blue light emitting diode elements are mixed and arranged as light emitting diode elements, it is possible to illuminate the original medium with three primary colors and white.

Other objects, advantages and salient features of the invention will become apparent from the following detailed description of the drawings.

BRIEF DESCRIPTION OF THE DRAWINGS

Preferred embodiments of the present invention will hereafter be described with reference to the following drawings wherein like reference numerals refer to the elements and wherein.

DETAILED DESCRIPTION OF PREFERRED EMBODIMENTS

Figure 1:
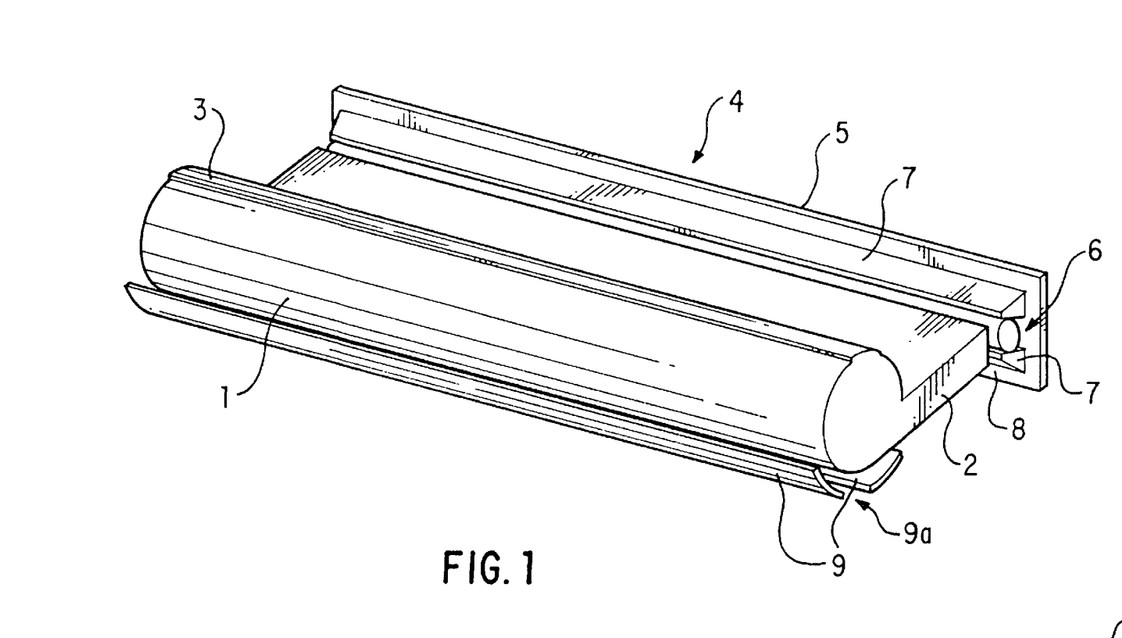
FIG. 1 is an oblique view of a first embodiment of the present invention.
Figure 2:
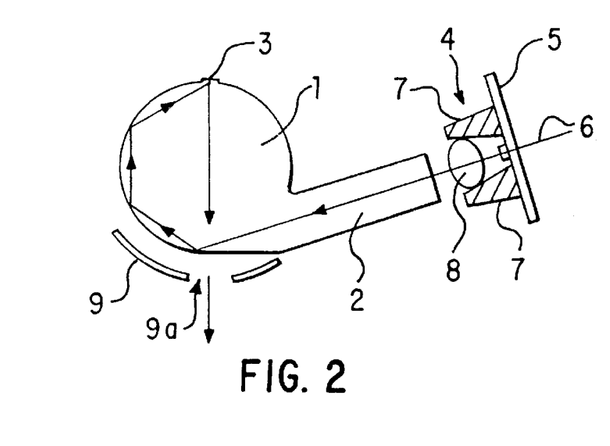
FIG. 2 is a vertical cross section of FIG. 1.

The first embodiment of the present invention will be described with reference to FIGS. 1 and 2. A sub-light guiding unit 2 is installed on the outer perimeter of a main light guiding unit 1 such that the sub-light guiding unit 2 forms one body with the main light guiding unit 1 and protrudes in a tangential direction. The sub-light guiding unit 2 is preferably formed in a flat shape using transparent plastic. The main light guiding unit 1 is rod-shaped using transparent plastic. The light scattering unit 3 is attached on an outer perimeter surface of the main light guiding unit 1. The light scattering unit 3 is linearly shaped having a preferable width of 1 to. 2 mm.

A light scattering unit 3 may be made by scattering minute granules having a high refraction index on resin.

The light source 4 faces an end surface of the sub-light guiding unit 2 and is parallel to the axial direction of the main light guiding unit 1. The light source 4 may have a similar structure to that shown in FIGS. 8–10. For example, the light source 4 may include a plurality of LEDs 6 arranged in a straight line on a rectangular board 5 having a reflection member 7 on both sides of the LED 6 array and formed in a convex shape using white plastic. A transparent, rod-shaped lens 8 would then be provided between the tips of the reflection member 7 on the ejection side.

A mirror 9 having an arc-shaped cross section with an inner reflection surface is placed on the outer perimeter of the main light guiding unit 1 opposite the light scattering unit 3. A slit 9a is provided along the axial direction at the center of the mirror 9.

Operation of this embodiment will now be described. The light rays emitted from the LEDs 6 and reflected by the reflection member 7 are linearly gathered by the lens 8 and guided to the sub-light guiding unit 2. The light rays entering the sub-light guiding unit 2 move straight into the main light guiding unit 1 and are repeatedly reflected by the inner surface. Some of light rays reaching the light scattering unit 3 exit from the opposite outer surface of the main light guiding unit 1. Only the light rays passing through the slit 9a reach the mirror 9 and are used for illumination light. The remaining light rays are reflected and returned by the inner surface of the mirror 9 to the main light guiding unit 1 for re-usage.

Thus, light is effectively used based on its reflection by an inner surface of the main light guiding unit 1 even when LEDs 6 are used with a relatively small amount of light. The distance from the LEDs 6 to the light scattering unit 3 can be made long to enable uniform, bright linear lighting. Use of the LEDs 6 as a light source reduces the power consumption, extends longevity and improves reliability. In addition, the use of plastics for the light guiding units 1 and 2 results in a smaller, lighter and more economical lighting device.

A second embodiment will now be described with reference to FIG. 3. In this embodiment, a second light source 13 is provided facing the end surface of the main light guiding unit 1. The second light source 13 preferably includes four LEDs 12 arranged on a board 11.

A light source color switching device is known to input color images. With such devices, a monochrome sensor is used for the CCD and signals are read by switching illumination light among red (R), green (G) and blue (B) for each scan line. Hence, LEDs are arranged in an LED array with R, G and B repeating. For example, the LED array repeats a flashing sequence of R->G->B->R->G->B. However, in this case, only one red LED is flashed for every three LED flashes to cause the interval between the LEDs to become longer and the illumination light to become uneven.

Figure 3:
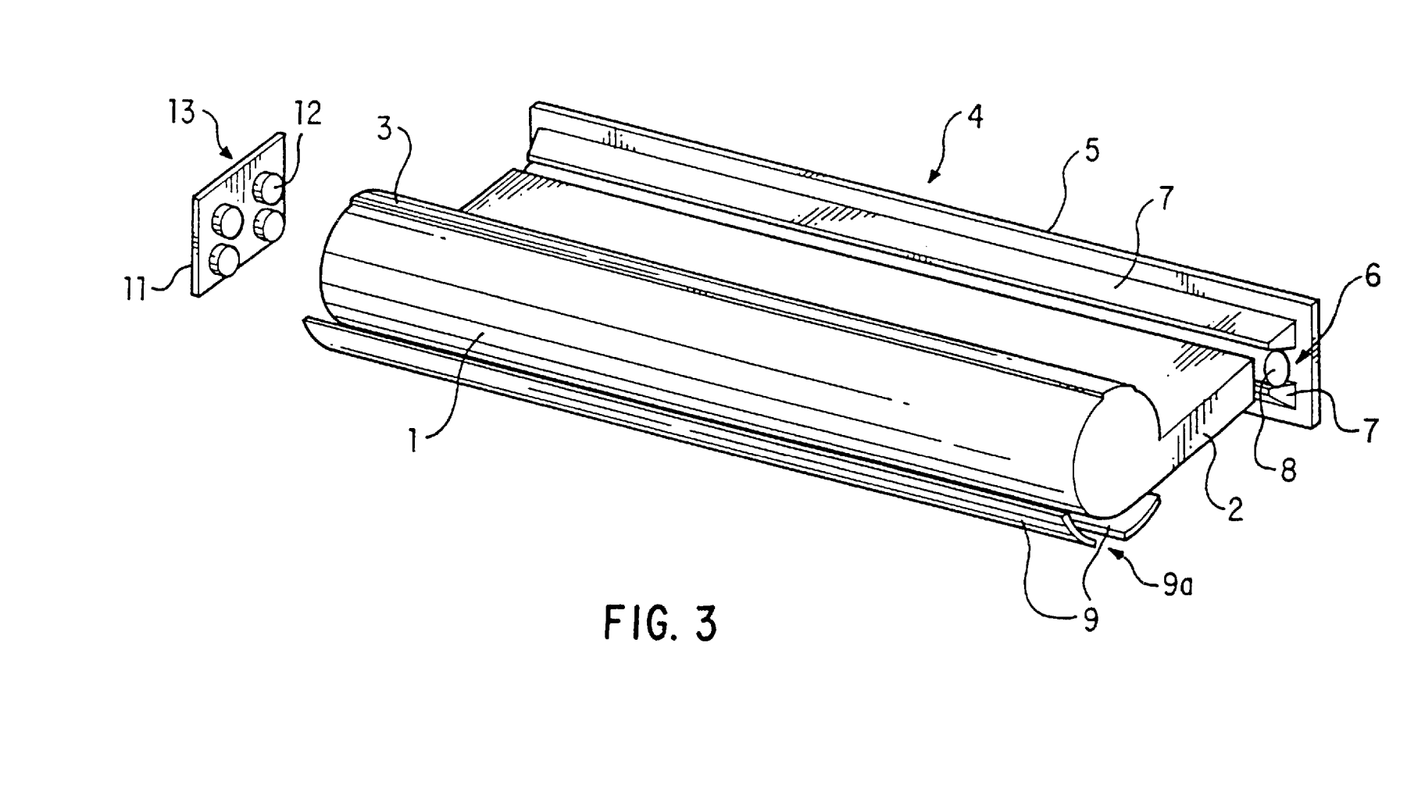
FIG. 3 is an oblique view of a second embodiment of the present invention.

Thus, the second embodiment uses either one or two colors as the first light source 4 placed on a straight line as in the first embodiment while an LED having a large amount of light is the second light source 13 as shown in FIG. 3.

This embodiment is capable of placing many LEDs having a small amount of light close together and producing a well balanced, linear illumination by combining them with light rays from an LED having a large amount of light as the second light source 13.

Figure 4:
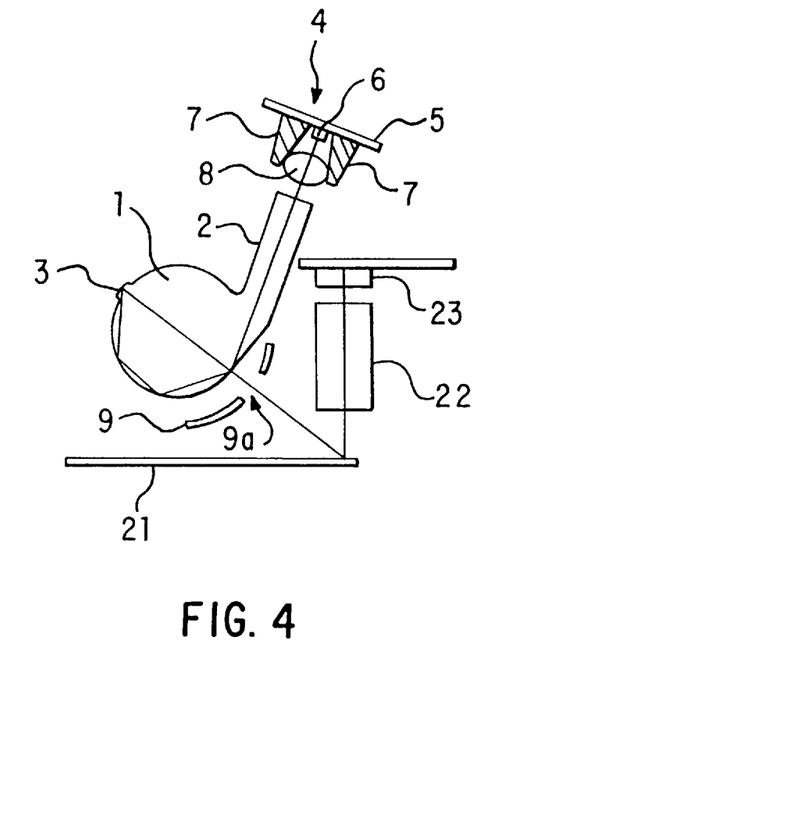
FIG. 4 is an vertical cross section of a third embodiment of the present invention.

A third embodiment will now be described with reference to FIG. 4. This embodiment integrates the lighting device of the first embodiment into a contact type image input device. The illuminating light rays emitted from the light source 4 are at an incidental angle to the original medium 21. The light rays reflecting from the original medium 21 are projected by a lens array 22 onto a contact type linear CCD 23, which is an equal magnification sensor. The original image 21 is then read. Color scanning occurs by reading the signals while flashing R, G and B light on each line of the original medium 21.

Figure 5:
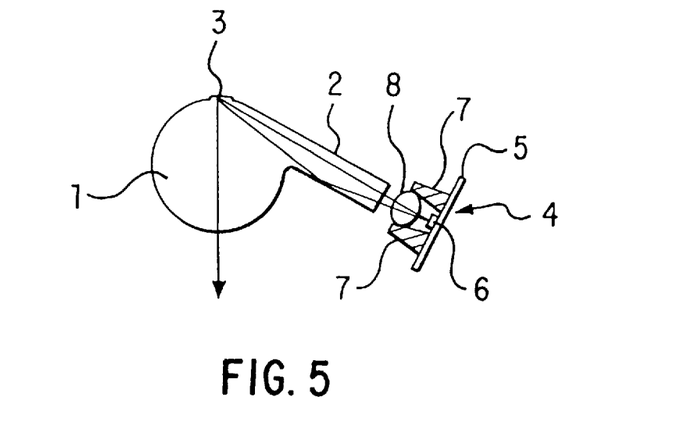
FIG. 5 is an vertical cross section of a fourth embodiment of the present invention.

A fourth embodiment will now be described with reference to FIG. 5. In this embodiment, the light scattering unit 3 is provided in an outer perimeter of the main light guiding unit 1 on the optical path where the light rays emitted from the LEDs 6 are gathered by the lens 8 on a straight line advancing straight within the sub-light guiding unit 2. Most of the light rays from the LEDs 6 are not reflected in the main light guiding unit 1 but rather enter directly into the light scattering unit 3 and are scattered. Of course, some light rays are reflected in the main light guiding unit 1 and reach the light scattering unit 3.

The light rays not reflected by the inner surface of the main light guiding unit 1 are scattered by the light scattering unit 3 and are emitted as the illuminating light.

In this type of lighting device, the light rays emitted from the light source are guided to a rod-shaped main light guiding unit through a flat plate sub-light guiding unit and are reflected by an inner surface of the main light guiding unit as well as being scattered by the light scattering unit. Hence, uniform, bright illumination is produced even if inexpensive, low power consuming, long life and highly reliable LEDs are used for the light source. Moreover, plastic may be used for light guiding units to obtain a smaller, lighter and more economical lighting device.

Another light source may be placed facing an end surface of the main light guiding unit to obtain a light source for switching colors with a uniform and balanced light amount. This is accomplished by closely placing numerous light sources with a small light amount and by placing a light source with a large light amount on the end surface of the main light guiding unit as shown in FIG. 3.

Figure 14:
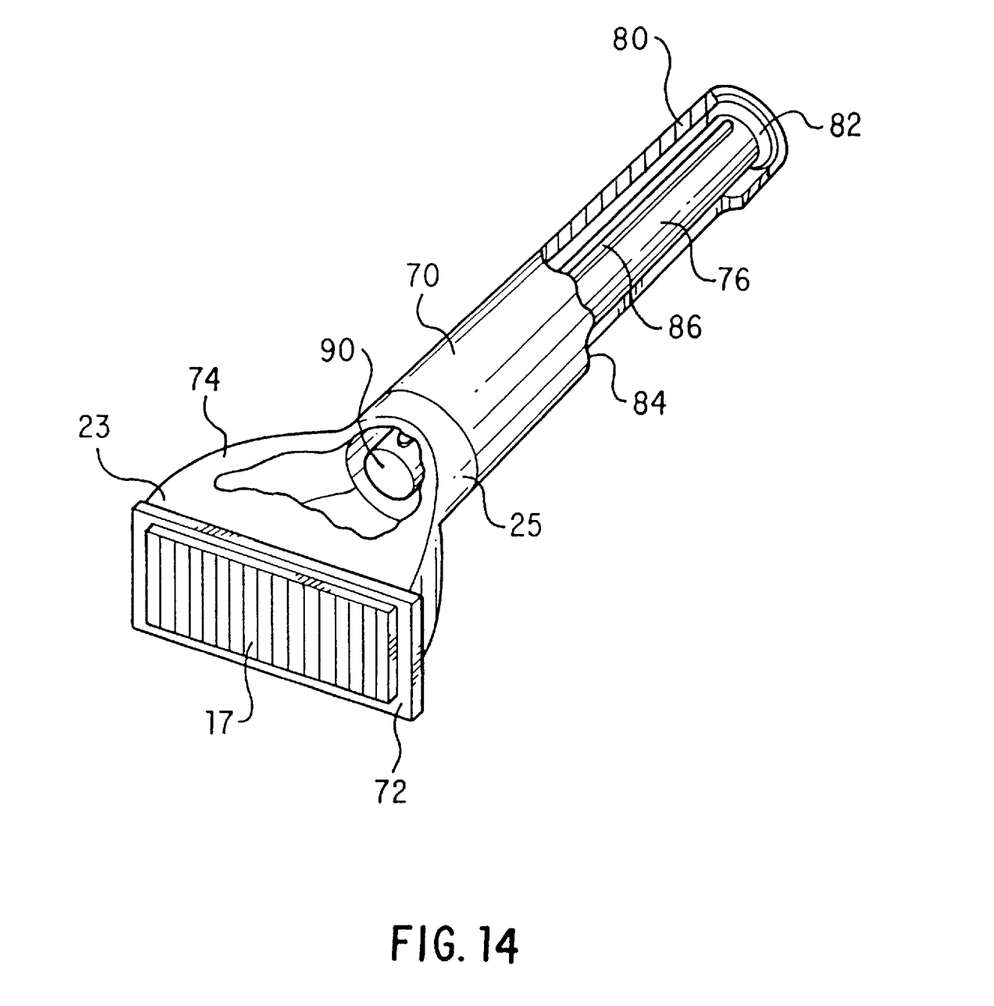
FIG. 14 is an oblique view showing a fifth embodiment of the present invention.

A fifth embodiment of the present invention will now be described with respect to FIGS. 14–16. A cylindrical outer shell unit 70 is anchored substantially perpendicular to a board 72 using a pipe-like connection member 74 covering the board 72 on which the light emitting diode elements 50 are bonded. The column-like light guiding unit 76 is inside the outer shell unit 70 and is anchored by the spacer 70. The tip 80 of the illumination device is sealed by an edge unit reflection member 82.

Figure 15:
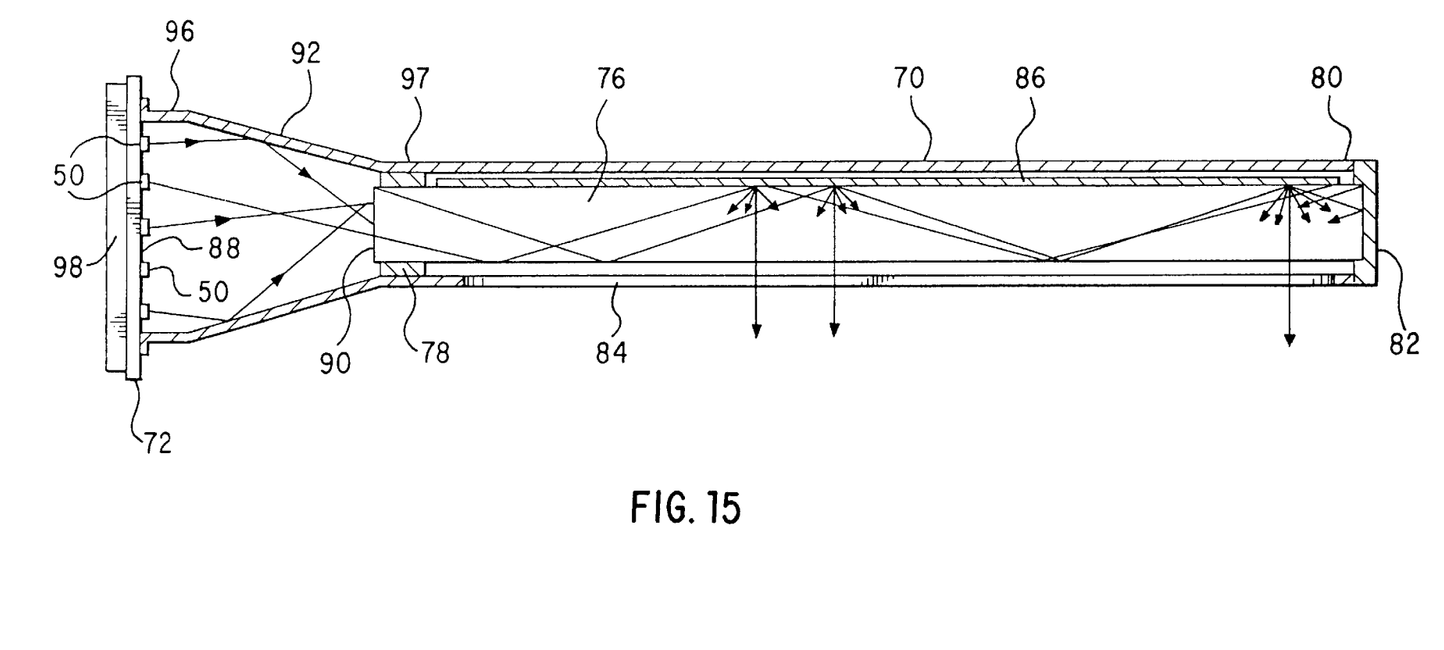
FIG. 15 is a front cross-sectional view of FIG. 14.
Figure 16:
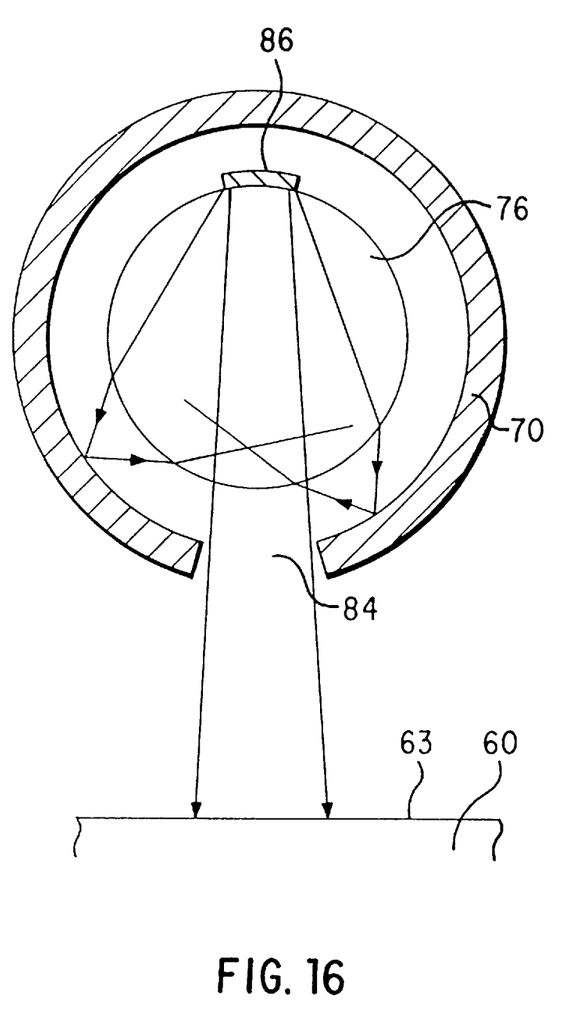
FIG. 16 is a side cross-sectional view of FIG. 14.

A linear space 84 is formed in the outer shell unit 70 along the axis as best shown in FIG. 15. A linear scattering reflection unit 86 is provided on the surface of the light guiding unit 76 facing the space 84.

The light guiding unit 76 is preferably made of highly transparent material into column-like shape. The scattering reflection unit 86 may be formed by coating a belt-like material extending linearly along the axis of the light guiding unit 76 or it may be formed by bonding reflecting tape to perform random reflection on the surface or inside the light guiding unit 76.

A mirror surface is provided inside the connection member 92 having one end square shaped to match the shape of the board 72 while the other end is substantially pyramid shaped to match the outer shell unit 70 and the light guiding unit 76.

As shown in FIG. 15, light rays from each light emitting diode elements 15 directly enter the light guiding unit 76 from the edge unit 90 or enter the light guiding unit 76 from the edge unit 90 after being reflected by the inner surface of the pipe-like connection member 92.

Part of the light rays entering the light guiding unit 76 are refracted and penetrate to the outside of the light guiding unit 76. Other light rays are reflected inside the light guiding unit 76 at the surface.

The light rays emitting from the surface of the light guiding unit 76 are reflected by the inner surface of the outer shell unit 70. These light rays are then returned inside the light guiding unit 76. Thus, it is desirable to make the inner surface of the outer shell unit 70 have a mirror surface.

The light rays entering the light guiding unit 76 from the edge unit 90 advance along the axis of the light guiding unit 76 after being reflected by the inner surface of the outer shell unit 70 and a surface of the light guiding unit 76. Upon reaching the other edge of the light guiding unit 76, the light rays are reflected by the terminal reflection member 82 and return along the axis of the light guiding unit while staying inside the light guiding unit 76.

Moreover, some of the light rays advancing inside the light guiding unit 31 are repeated reflected. The light rays reflected by the scattering reflection unit 86 produce random reflections having various reflection directions. Thus some of the light rays are reflected by the scattering reflection unit 86 such that the reflected light rays are released outside the light guiding unit 76 as shown in FIGS. 15 and 16.

Furthermore, because a space 84 is provided in the outer shell 70 at the position facing the scattering reflection unit 86, the randomly reflected light rays are released outside of the light guiding unit 76 to illuminate the original manuscript 60.

The width of the scattering reflection unit 86 is smaller than half of the circumference of the light guiding unit 76 in order to illuminate the light rays on the original manuscript 60.

If the width of the scattering reflection unit 86 is made larger, the amount of light passing through the space 84 can be increased. On the other hand, by making the width smaller, the amount of randomly reflected light rays can be decreased, which results in increasing the amount of light rays repeatedly reflected inside the light guiding unit 76.

By making the width of the space 84 less than half of the circumference of the outer shell 76, the light rays passing through the space 84 illuminate the surface of the original manuscript 60. The light rays radiated from the surface of the light guiding unit 76 away from the original manuscript 60 are reflected by an inner surface of the outer shell 70 and returned to the light guiding unit 76. Moreover, by making the outer shell 70 larger than half of the circumference, outside light is prevented from entering the light guiding unit 76 and from illuminating the illumination area of the original manuscript 60.

Hence, by making the scattering reflection unit 86 and the space 84 narrow, the light rays that repeatedly reflect inside the light guiding unit 76 are radiated outside through the space 84 to enable more overall uniform intensity of the illumination light.

The width of the scattering reflection unit 86 and the space 84 are predetermined so that the illumination width on the original medium is several millimeters although the reading width on the original medium is about 0.1 mm to accommodate errors such as mechanical shift between the reading position and the illumination area.

Figure 17:
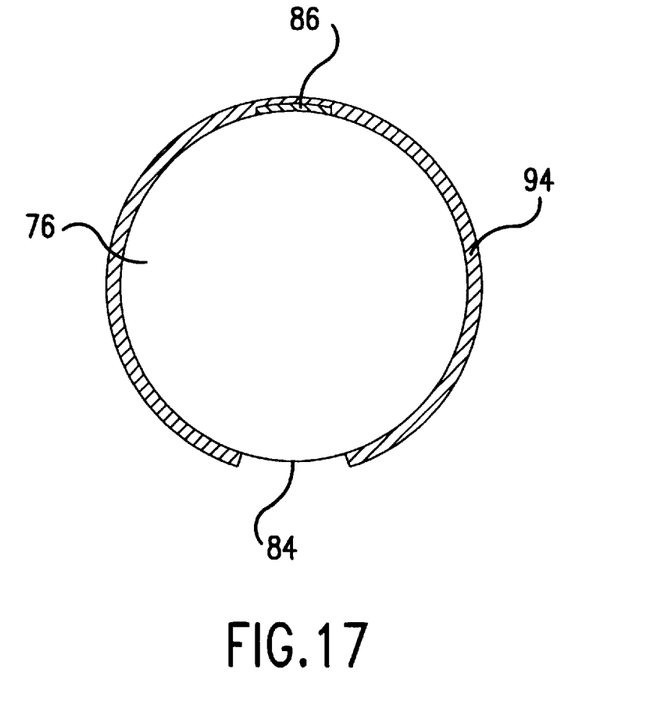
FIG. 17 is a side cross-sectional view of a sixth embodiment of the present invention.

Although the outer shell 70 is used as a reflection member in the above embodiment, a reflection member may also include a belt-like scattering reflection unit formed as part of the column-like light guiding unit 76 together with a reflection membrane 94 such as aluminum and formed in such manner that the space 84 is created at a position facing the scattering reflection unit 86 as shown in FIG. 17 showing a sixth embodiment of the present invention.

The light guiding unit 76 having either the scattering reflection unit 86 or reflection membrane 94 is anchored on the tip of the connection member 92 using a spacer similar to the fifth embodiment described in FIG. 15 and a terminal reflection member 82 fitted into the other edge of the light guiding unit 76. Hence, the light rays entering from the edge unit 90 are reflected to advance inside the light guiding unit 31. Some of the light rays randomly reflected by the scattering reflection unit 86 can be radiated outside from the space 84 similar to the previous embodiments.

By using a reflection member having a reflection membrane 94 on the surface of the light guiding unit 76, the light rays are repeatedly reflected inside the light guiding unit 76 to minimize the weakening of the light rays. This enables the illumination device to be easily made narrower and smaller. When a reflection member is formed using the outer shell 70, the reflection member is hard to be scratched thus making handling of the illumination device easier.

Although the embodiment described in FIG. 15 uses a pyramid-shaped connection member 92 having a base unit 97 larger than a width of the light guiding unit 76 to connect the board 72 and the light guiding unit 76, the width of the board 72 may be made substantially equal to the diameter of the light guiding unit 76 while the length of the board 72 may be made larger than the diameter of the light guiding unit 76.

In this case, a connection member 92 may be made pipe-shaped, closer to a square pyramid formed by a top board and a bottom board that are nearly parallel to each other and having triangular plates and side wall units comprising two flat plates with bottom units 96 extending in the direction away from each other to make the space between them wider. In this case, molding manufacturing of the connection member 92 is easier and the height of the illumination device is shorter.

The board 72 is not limited to a rectangular shape but may be circular, in which case the connection member 92 may have a form of cone-like pipe.

Further, although the light emitting diode elements 50 are densely arranged on the inner surface 88 of the board 72, it is preferable to have space between the individual light emitting diode elements 50 having an appropriate mirrored surface so that the light rays emitting from the edge unit 90 of the light guiding unit 76 are reflected back to the light guiding unit 76.

An appropriate heat discharging board 98 is then provided on the outer surface of the board 72 so that the heat generated by the dense light emitting diode elements 50 is dissipated.

Moreover, light emitting diode elements 50 are not limited to elements that emit the light with specific wavelengths corresponding to characteristics of the shooting elements in the image input device. In other words, red, green and blue light emitting diode elements may be used together.

In this case, lighting by white light as well as the three primary colors of red, green and blue becomes possible by limiting the flashing light emitting diode elements 50.

A quick and stable lighting with long longevity becomes possible since the illumination device uses light emitting diode elements. Further, linear lighting with uniform overall illumination becomes possible because the light rays are repeatedly reflected inside the light guiding unit.

The light guiding unit may be stored inside the outer shell to simplify the manufacturing process as well as enable excellent lighting by shielding external random light rays from the outer shell.

Furthermore, because the reflection membrane is formed on the surface of the light guiding unit, the manufacturing process becomes simple by installing the light guiding unit to the connection member to result in an illumination device with smaller diameter and lighter weight.

All the light rays emitted through the space 94 may be illuminated onto the original medium to enable effective illumination of the light rays onto the original medium.

The invention is capable of guiding the light rays into the light guiding unit 76 without waste as well as returning the light rays emitted from the edge unit 90 of the light guiding unit.

The illumination device is also capable of illuminating with white light and three primary colors for the formation of color image data.

While the invention has been described with reference to preferred embodiments, these embodiments are intended to be illustrative and not limiting. That is, various modifications and changes can be made without departing from the spirit and scope of the invention as defined in the appended claims.

What is claimed is:

1. A lighting device comprising:

a main light guiding unit formed by a rod-shaped transparent member defining an axial direction;

a sub-light guiding unit connected to an outer perimeter of the main light guiding unit and extending tangentially from the main light guiding unit;

a linear-shaped light scattering unit provided along the axial direction of main light guiding unit; and a light source linearly parallel to the axial direction of the main light guiding unit and facing the sub-light guiding unit.

2. The lighting device of claim 1, wherein the sub-light guiding unit is placed with such an angle that the light rays are guided from the light source through the sub-light guiding unit to an inner surface of the main light guiding unit.

3. The lighting device of claim 1, wherein the light source includes a plurality of light emitting elements.

4. The lighting device of claim 1, further comprising a mirror device provided along the axial direction of the main light guiding unit and having an axial slit allowing light to pass out of the main light guiding unit.

5. The lighting device of claim 1, further comprising another light source facing one axial end of the main light guiding unit.

6. The lighting device of claim 5, wherein the another light source includes a plurality of light emitting elements.

7. The light device of claim 5, wherein the light source and the another light source include red, green and blue light emitting elements.

8. The light device of claim 1, further comprising a lens array and a linear sensor to read an original image.

9. The lighting device of claim 1, wherein the sub-light guiding unit is substantially flat.

10. An illumination device comprising:

a cylindrical light guiding unit;

a light source having a plurality of light emitting devices;

a connecting device provided between the light guiding unit and the light source for guiding light to the light guiding unit;

a light scattering reflection member extending linearly along an axial direction of the cylindrical light guiding unit; and a space extending linearly along the axial direction of the light guiding unit to allow light to pass, wherein the connecting device comprises a guiding unit connected to an outer perimeter of the cylindrical light guiding unit and extending from the cylindrical light guiding unit in a direction perpendicular to an axial direction of the light guiding unit.

* * * * *

UNITED STATES PATENT AND TRADEMARK OFFICE
CERTIFICATE OF CORRECTION

PATENT NO. : 5,810,463
DATED : September 22, 1998
INVENTOR(S) : Atsushi KAWAHARA It is certified that error appears in the above-identified patent and that said Letters Patent is hereby corrected as shown below: On the title,page, under item [19], delete "et al".

On the cover page, line [75], change "Inventors: Atsushi Kawahara, Yokohama; Osamu Inoue, Kumagaya, both of Japan" to --Inventor: Atsushi Kawahara, Yokohama, Japan--.

Signed and Sealed this

Twenty-second Day of June, 1999

Attest:

Q. TODD DICKINSON

*Attesting Officer*  Acting Commissioner of Patents and Trademarks